(12) United States Patent
Nhep

(10) Patent No.: US 8,573,855 B2
(45) Date of Patent: Nov. 5, 2013

(54) FANOUT CABLE ASSEMBLY AND METHOD

(75) Inventor: Ponharith Nhep, Savage, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 636 days.

(21) Appl. No.: 12/573,696

(22) Filed: Oct. 5, 2009

(65) Prior Publication Data

US 2010/0092136 A1 Apr. 15, 2010

Related U.S. Application Data

(60) Provisional application No. 61/103,108, filed on Oct. 6, 2008.

(51) Int. Cl.
*G02B 6/36* (2006.01)
*G02B 6/00* (2006.01)

(52) U.S. Cl.
USPC .................. 385/77; 385/53; 385/86; 385/135

(58) Field of Classification Search
USPC ...................... 385/53, 54, 71, 76–78, 86, 135
See application file for complete search history.

(56) References Cited

U.S. PATENT DOCUMENTS

| | | |
|---|---|---|
| 5,231,688 A | 7/1993 | Zimmer |
| 5,754,725 A | 5/1998 | Kuder et al. |
| 5,970,195 A | 10/1999 | Brown |
| 6,072,932 A | 6/2000 | Bennett et al. |
| 6,389,214 B1 | 5/2002 | Smith et al. |
| 6,421,493 B1 | 7/2002 | Burek et al. |
| 6,571,048 B1 | 5/2003 | Bechamps et al. |
| 6,623,173 B1 | 9/2003 | Grois et al. |
| 6,655,848 B2 | 12/2003 | Simmons et al. |
| 6,738,555 B1 | 5/2004 | Cooke et al. |
| 6,873,772 B2 | 3/2005 | Nakaya |
| 6,885,798 B2 | 4/2005 | Zimmel |
| 6,909,828 B2 | 6/2005 | Zimmel et al. |
| 7,035,510 B2 | 4/2006 | Zimmel et al. |

(Continued)

FOREIGN PATENT DOCUMENTS

| | | |
|---|---|---|
| AT | 408 698 | 2/2002 |
| CN | 1289930 C | 12/2006 |
| DE | 44 05 459 | 8/1995 |
| DE | 102 07 337 | 11/2002 |
| DE | 10 009 223 | 8/2008 |
| EP | 0 355 639 | 2/1990 |

(Continued)

OTHER PUBLICATIONS

Exhibit A, Fanout product by ADC Telecommunications, Inc., 2 pages, admitted as prior art as of Oct. 6, 2008.

(Continued)

*Primary Examiner* — Ryan Lepisto
*Assistant Examiner* — Erin Chiem
(74) *Attorney, Agent, or Firm* — Merchant & Gould P.C.

(57) ABSTRACT

A cable fanout defines an entry location for receiving a multi-fiber cable at one end, and an opposite end defining an exit location for individual cables. The cable fanout includes an inner housing having a first end defining a plurality of openings for the individual cables, and first and second side extensions extending in a longitudinal direction. The cable fanout further includes an outer housing including first and second identical halves enclosing the inner housing. One of the halves and the inner housing cooperating to form a pocket for holding epoxy around exposed fibers in the fanout during assembly. In a preferred embodiment, a snap arrangement mounts the first and second outer housing halves together.

20 Claims, 21 Drawing Sheets

(56) References Cited

U.S. PATENT DOCUMENTS

| | | |
|---|---|---|
| 7,270,485 B1 | 9/2007 | Robinson et al. |
| 7,277,614 B2 | 10/2007 | Cody et al. |
| 7,418,181 B2 | 8/2008 | Zimmel et al. |
| 7,738,759 B2 | 6/2010 | Parikh et al. |
| 7,933,484 B2 | 4/2011 | Hetzer et al. |
| 2002/0141724 A1 | 10/2002 | Ogawa et al. |
| 2003/0031437 A1 | 2/2003 | Simmons et al. |
| 2004/0126069 A1 | 7/2004 | Jong et al. |
| 2005/0041926 A1 | 2/2005 | Elkins, II et al. |
| 2008/0138026 A1 | 6/2008 | Yow et al. |
| 2009/0035987 A1* | 2/2009 | Daly et al. .................... 439/502 |
| 2009/0060421 A1* | 3/2009 | Parikh et al. .................... 385/71 |
| 2010/0092136 A1 | 4/2010 | Nhep |

FOREIGN PATENT DOCUMENTS

| | | |
|---|---|---|
| EP | 0 490 698 | 6/1992 |
| EP | 0 646 811 | 4/1995 |

OTHER PUBLICATIONS

Exhibit B, Fanout product by ADC Telecommunications, Inc., 5 pages, admitted as prior art as of Oct. 6, 2008.

Exhibit C, Fanout product by ADC Telecommunications, Inc., 7 pages, admitted as prior art as of Oct. 6, 2008.

International Search Report and Written Opinion mailed Feb. 1, 2010.

* cited by examiner

FANOUT CABLE ASSEMBLY AND METHOD

CROSS REFERENCE TO RELATED APPLICATION

This application claims the benefit of provisional application Ser. No. 61/103,108, filed Oct. 6, 2008, which is incorporated herein by reference in its entirety.

TECHNICAL FIELD

The present invention relates to a telecommunications fanout assembly and method for fanning out a multi-fiber cable into individual fibers.

BACKGROUND OF THE INVENTION

Cable fanouts are known which define a location where a single telecommunications cable including a plurality of signal-carrying members is fanned out or broken out into individual cables. There is a need for improved developments in this area.

SUMMARY OF THE INVENTION

One aspect of the present invention relates to a cable fanout for connecting a multi-fiber cable to a plurality of individual cables. The cable fanout includes a housing construction having a first end defining an entry location for receiving the multi-fiber cable, and a second opposite end defining an exit location for the individual cables. The individual fibers extend in a continuous manner from the jacket of the multi-fiber cable through the housing construction to furcation or breakout tubes of the individual cables. The housing construction preferably defines a cylindrical shape.

In the preferred embodiment, the housing construction includes an inner housing and an outer housing. The inner housing includes an end defining a plurality of openings for the individual cables to exit the fan out, and first and second side extensions extending in a longitudinal direction toward the opposite end. The outer housing includes first and second housing portions enclosing the inner housing. One of the first and second outer housing portions and the inner housing cooperate to form a receptacle or pocket for holding epoxy to enclose the fibers positioned in the housing construction during assembly. In a preferred embodiment, a snap arrangement mounts the first and second outer housing portions together.

The present invention also relates to a method of assembly of a cable fanout.

DETAILED DESCRIPTION OF THE PREFERRED EMBODIMENT

Figure 1:
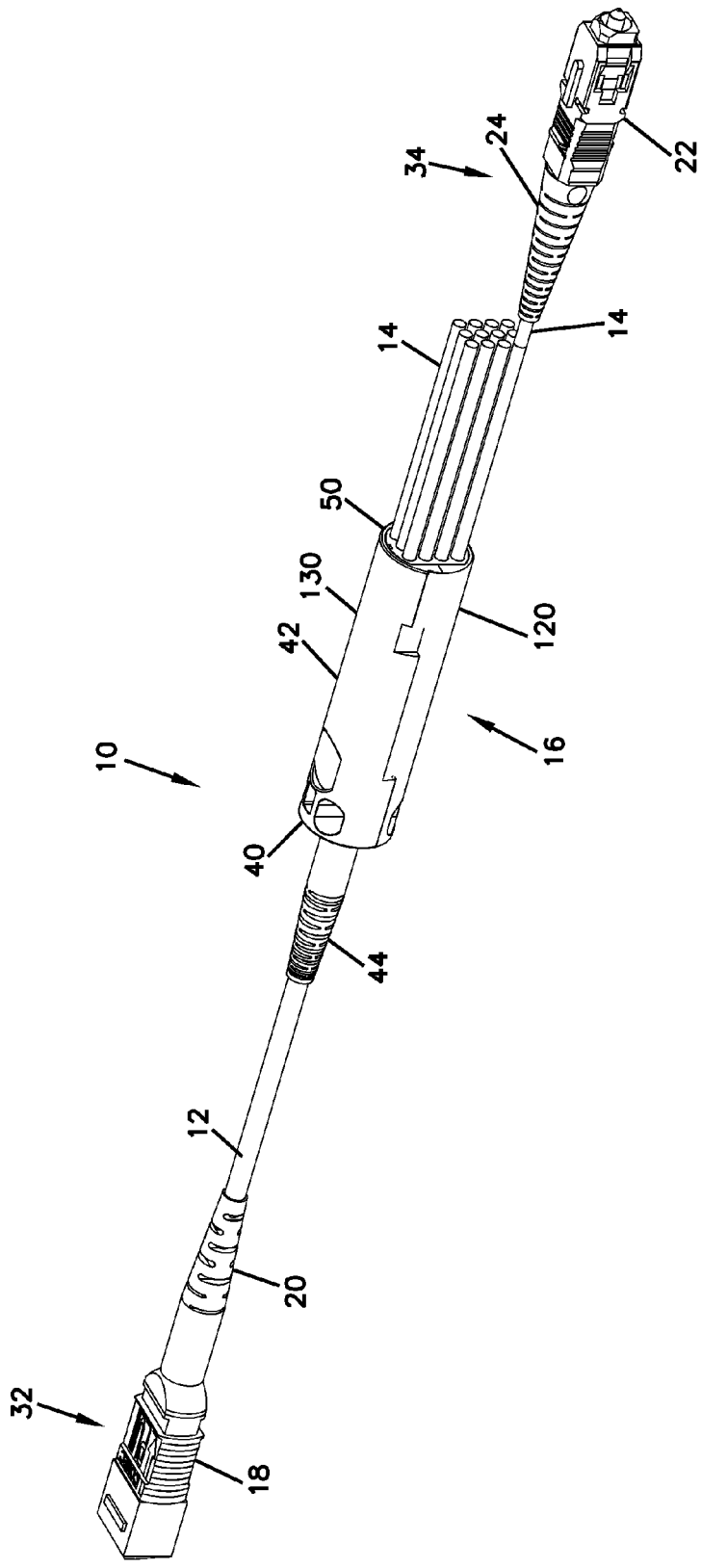
FIG. 1 is a perspective view of a fanout cable assembly including a multi-fiber input cable, and a plurality of individual output cables.
Figure 2:
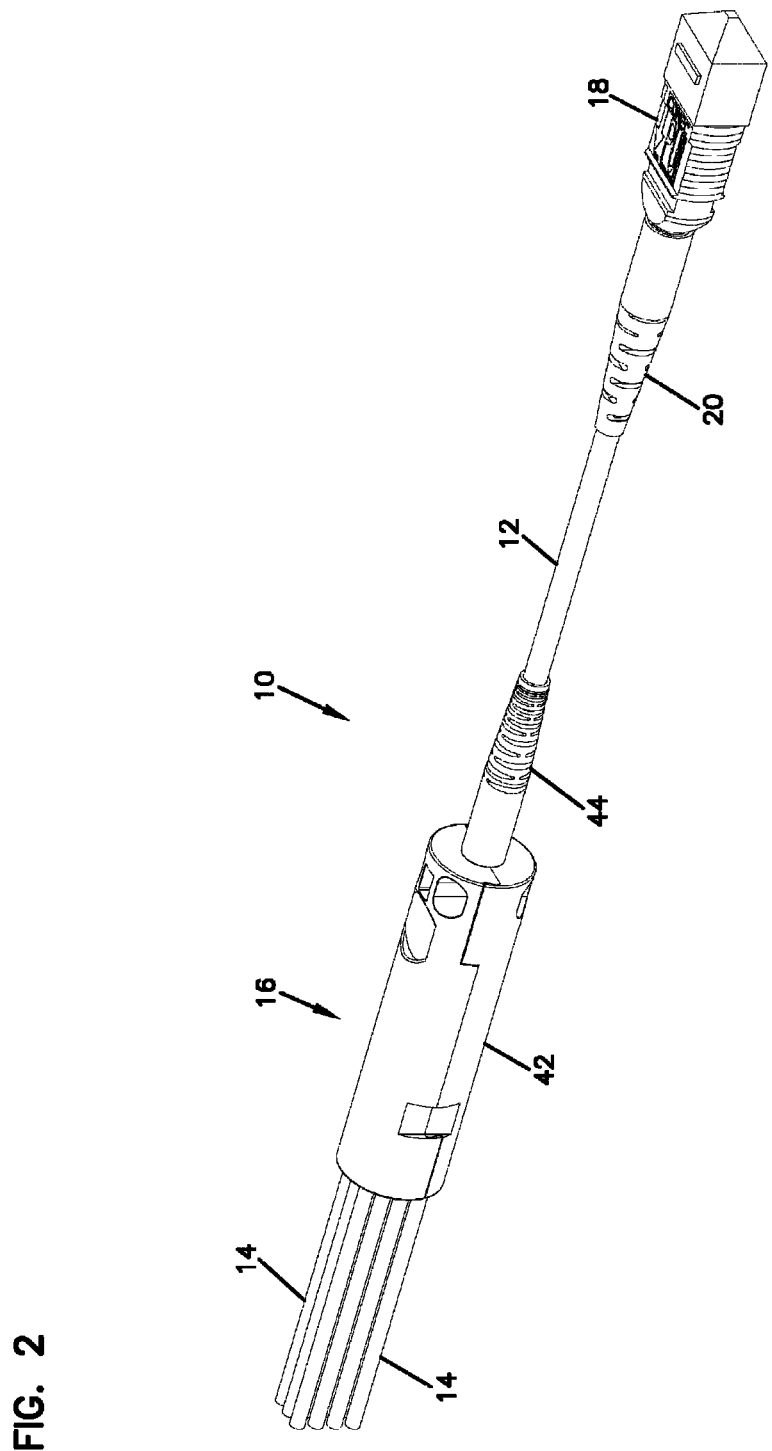
FIG. 2 is a further perspective view of the fanout cable assembly of FIG. 1.
Figure 3:
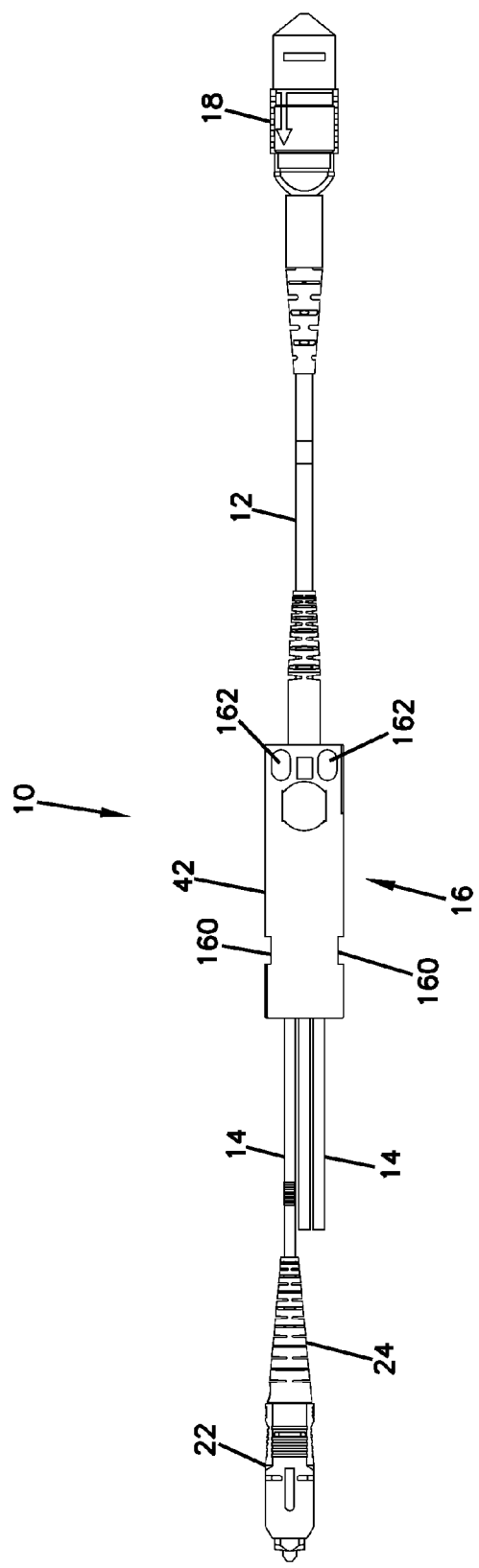
FIG. 3 is a top view of the fanout cable assembly of FIG. 1.

Referring now to FIGS. 1-5, a fanout cable assembly 10 is shown. A multi-fiber cable 12 is fanned out into separate output cables 14 at fanout 16. Multi-fiber cable 12 is terminated at a distal end 32 with a multi-fiber connector 18, such as an MTP connector. In the illustrated embodiment, multi-fiber connector 18 includes a protective strain relief boot 20. Multi-fiber cable 12 can be any length as desired. In some embodiments, multi-fiber cable 12 can be several hundred feet long. Fanout cable assembly 10 can be used in a variety of embodiments and environments where telecommunications equipment is employed. Fanout 16 allows for the multi-fiber cable 12 to be broken out or fanned out into individual output cables 14 which are typically terminated at distal ends 34 with connectors 22, such as SC connectors in the illustrated embodiment. For clarity, only one output connector 22 is shown. Each output cable 14 would be terminated with a connector 22 in actual use. Typically, connectors 22 include a protective strain relief boot 24.

Figure 4:
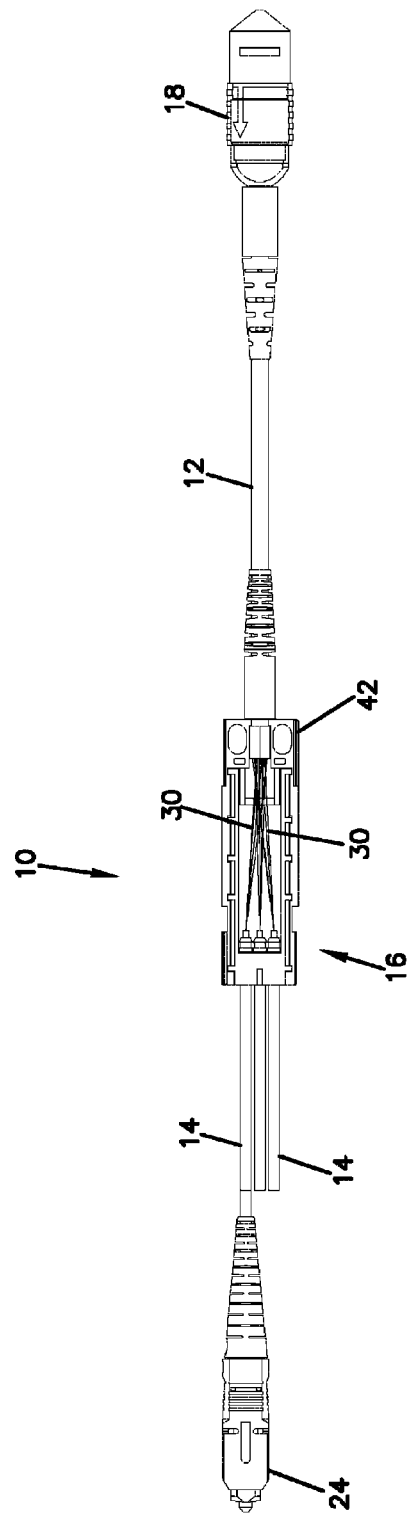
FIG. 4 is a top view of the fanout cable assembly, showing an upper housing portion removed.
Figure 5:
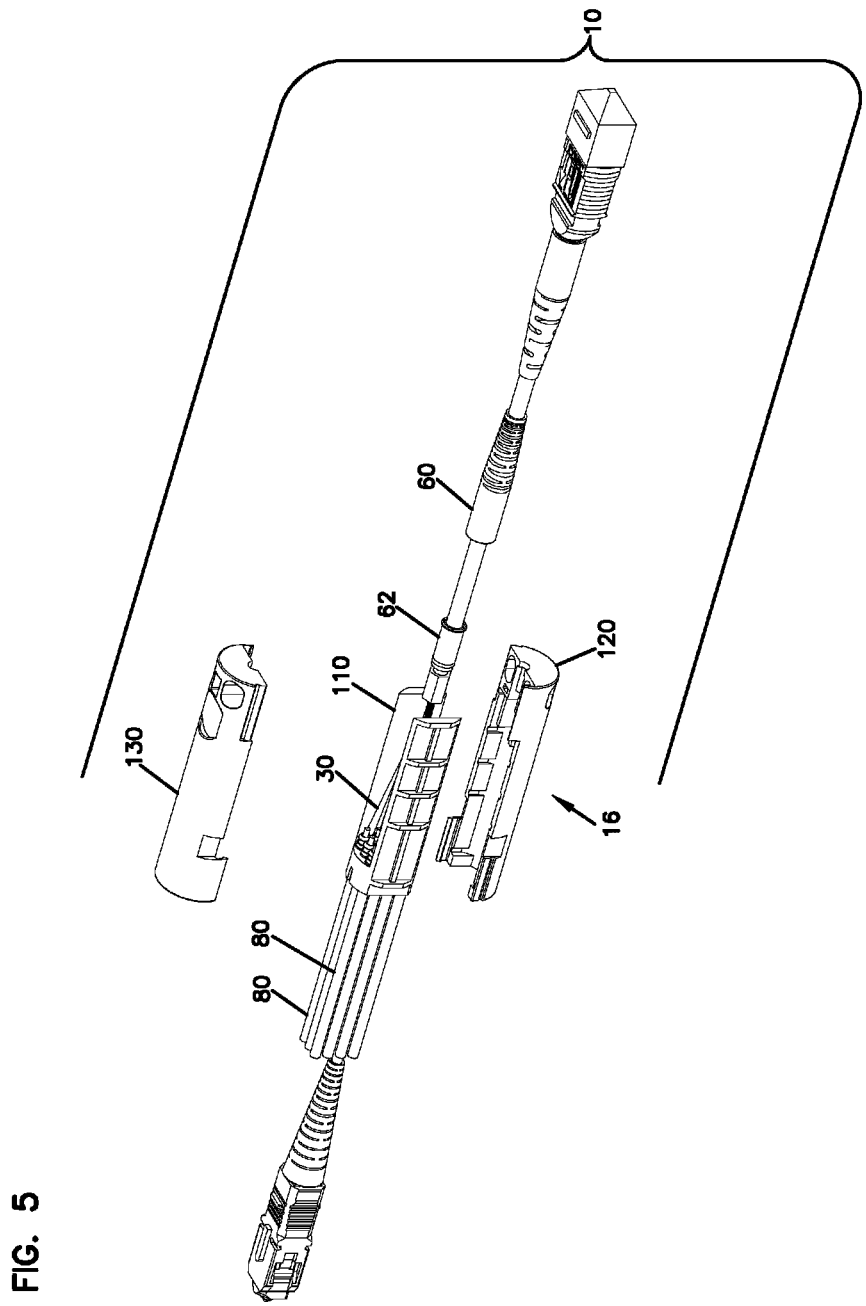
FIG. 5 is a perspective view of the fanout cable assembly showing both the upper and lower housing portions in exploded view.
Figure 7:
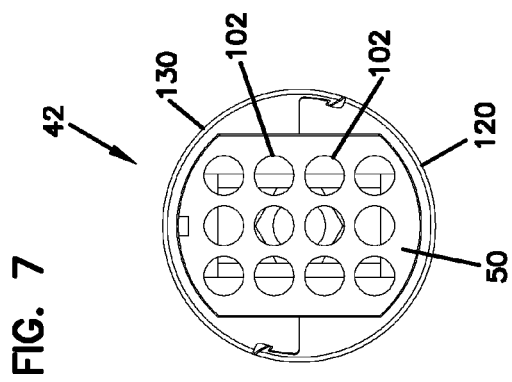
FIG. 7 is an end view of the fanout assembly body.
Figure 6:
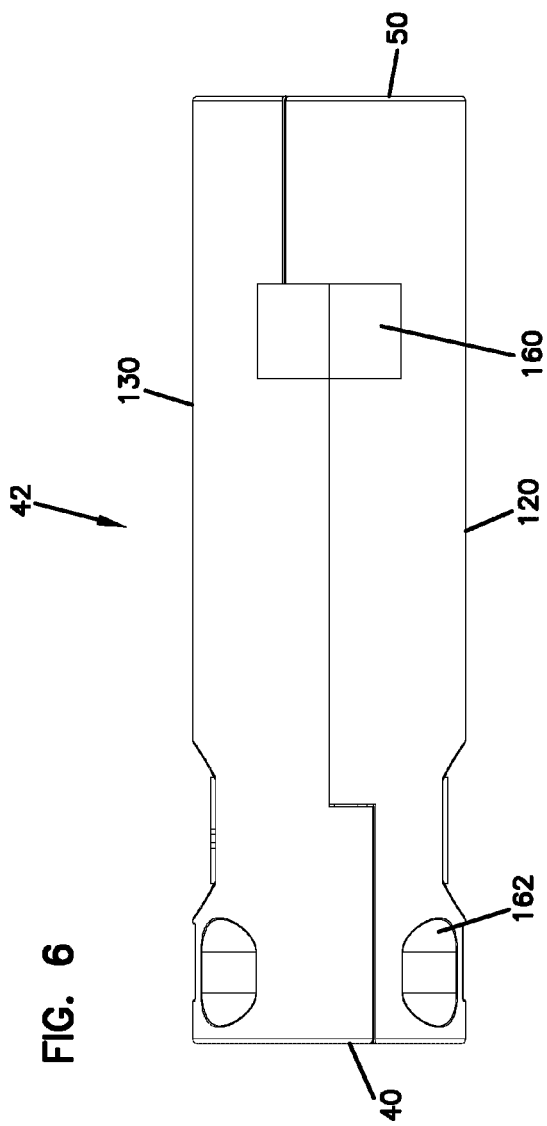
FIG. 6 is a side view of the fanout assembly body.
Figure 8:
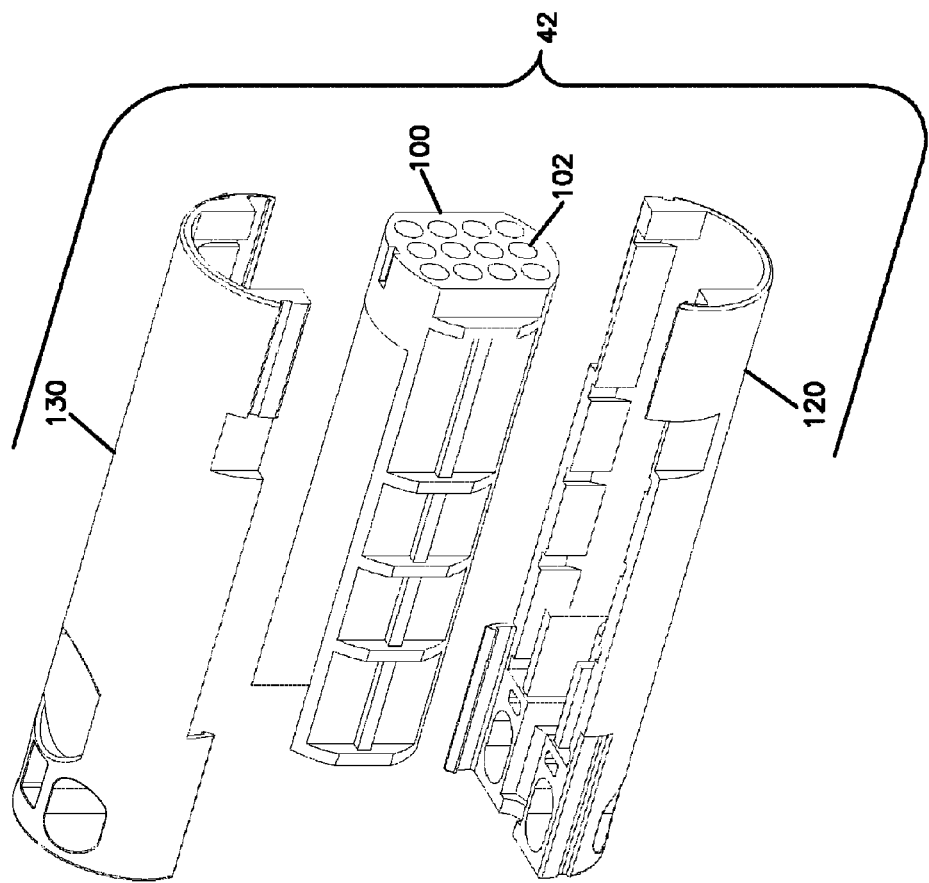
FIG. 8 is an exploded perspective view of the fanout assembly body.

Disposed within multi-fiber cable 12 is a plurality of individual fibers 30, visible in FIGS. 4 and 5. At fanout 16, the individual fibers 30 are broken out into the individual output cables 14. Output cables 14 may also be referred to as furcation fibers. Often, individual fibers 30 are bare fibers, such as 250 micron fibers, which are fragile and easily damaged. The output fibers 14 with their protective jackets of fanout cable assembly offer protection of the individual fibers 30, one per cable 14, as the fibers extend from fanout 16 to fiber terminations in the equipment. For example, fanout cable assembly 10 can be used with a wall box where input cable 12 extends from the wall box to a remote multi-fiber connection, and fanout 16 and the output cables 14 and connectors 22 are housed within the wall box connected to fiber optic adapters in the wall box.

With reference to FIGS. 1-8, fanout 16 includes an input end 40, and an output end 50. A protective strain relief boot 44 may be positioned at input end 40 for cable 12. Fanout 16 includes a fanout assembly body 42. Body 42 provides structure for mounting to multi-fiber cable 12 and output cables 14. Preferably, body 42 also defines a housing for receiving epoxy for surrounding and securing fibers 30 extending between cables 12, 14. In the illustrated embodiment, body 42 defines a cylindrical shape extending in a longitudinal direction from input end 40 to output end 50.

Figure 9:
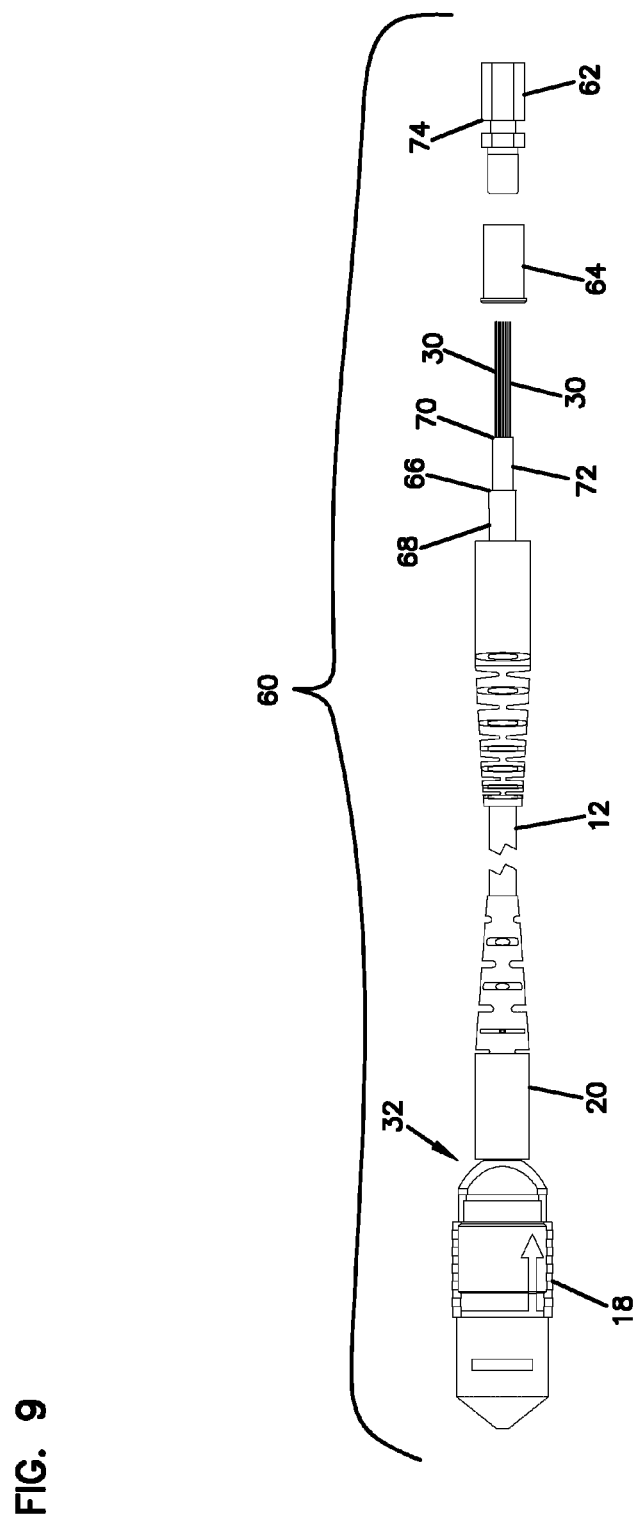
FIG. 9 shows an input cable assembly in exploded view.

Multi-fiber cable 12 is provided as an input cable assembly 60, such as shown in FIG. 9. Input cable assembly 60 includes an insert 62 and a crimp 64 which connect to proximal end 66 of cable jacket 68 and proximal end 70 of cable strength member 72, such as aramid (Kevlar) yarn. Crimp 64 holds proximal end 66 of cable jacket 68 and proximal end 70 of cable strength member 72 to insert 62. Insert 62 includes a notch 74 for engagement with body 42 as shown in FIGS. 14 and 15.

Figure 10:
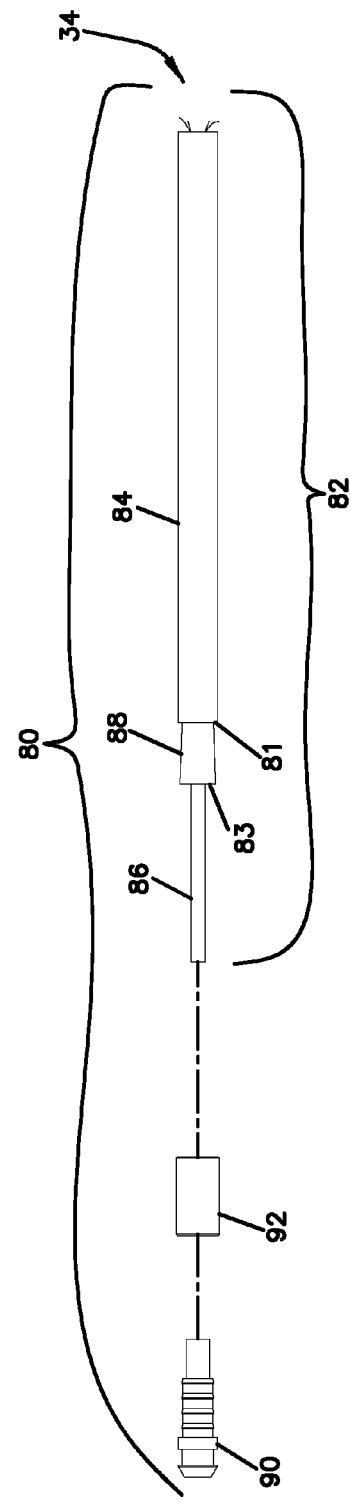
FIG. 10 shows an output furcation cable assembly in exploded view.
Figure 11:
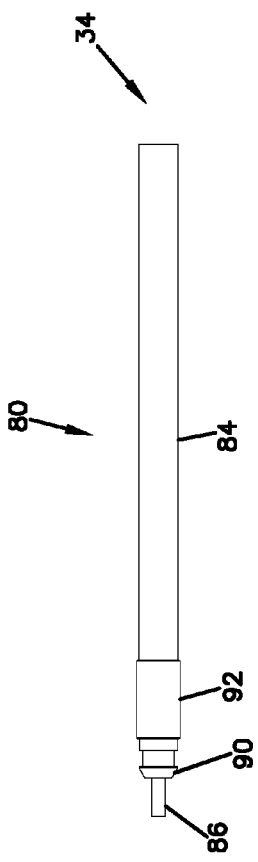
FIG. 11 shows the output furcation cable assembly fully assembled.

Output cables 14 are provided in the form of output furcation cable assemblies 80 which provide an upjacket 82 (i.e., a furcation jacket) for fibers 30 extending from input cable assembly 60. As shown in FIGS. 10 and 11, each output furcation cable assembly 80 includes an outer tube 84 and an inner tube 86. An intermediate strength member 88, such as aramid (Kevlar) yarn is provided. An insert 90 mounts to proximal end 81 of outer tube 84 and proximal end 83 of strength member 88 with a crimp 92. Inner tube 86 can also be affixed to insert 90, such as with an adhesive, such as epoxy.

Figure 12:
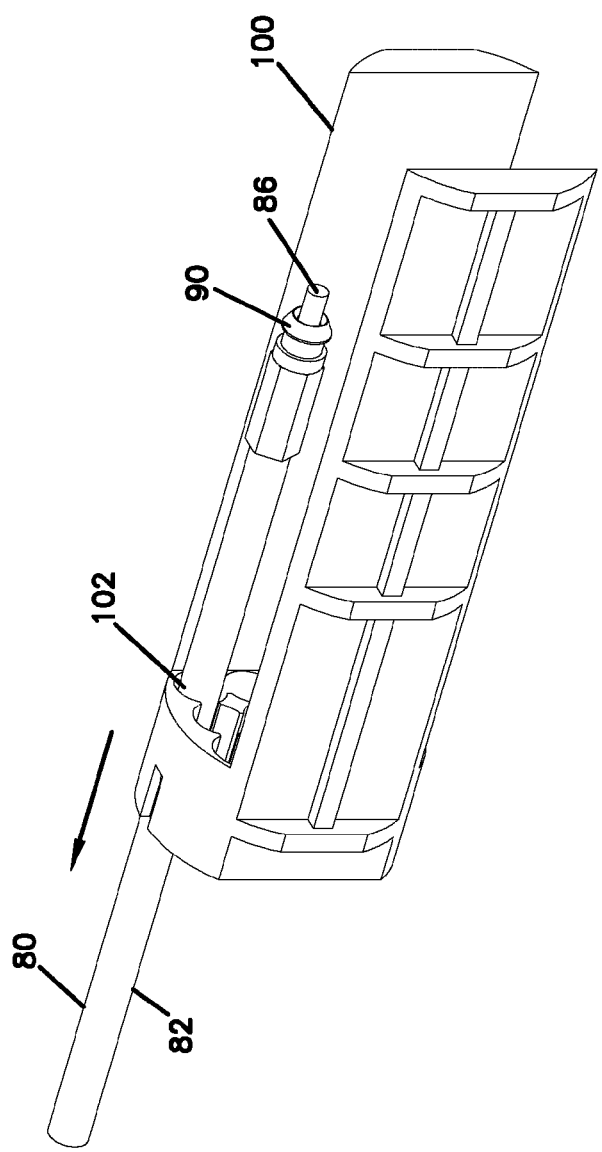
FIG. 12 shows the output furcation cable assembly being assembled to an inner housing of the fanout assembly body.

As shown in FIG. 12, each output furcation cable assembly 80 is mounted to an inner housing 100 of body 42. Each upjacket 82 is inserted into an opening 102 of inner housing 100 from an inside of inner housing 100. Inserts 90 and crimps 92 act as stops in openings 102 to prevent each output furcation assembly 80 from being removed from inner housing 100. Once each output furcation assembly 80 is in place, input cable assembly 60 is mated by inserting protruding fibers 30 through inner tubes 86, one fiber 30 per tube 86.

Figure 13:
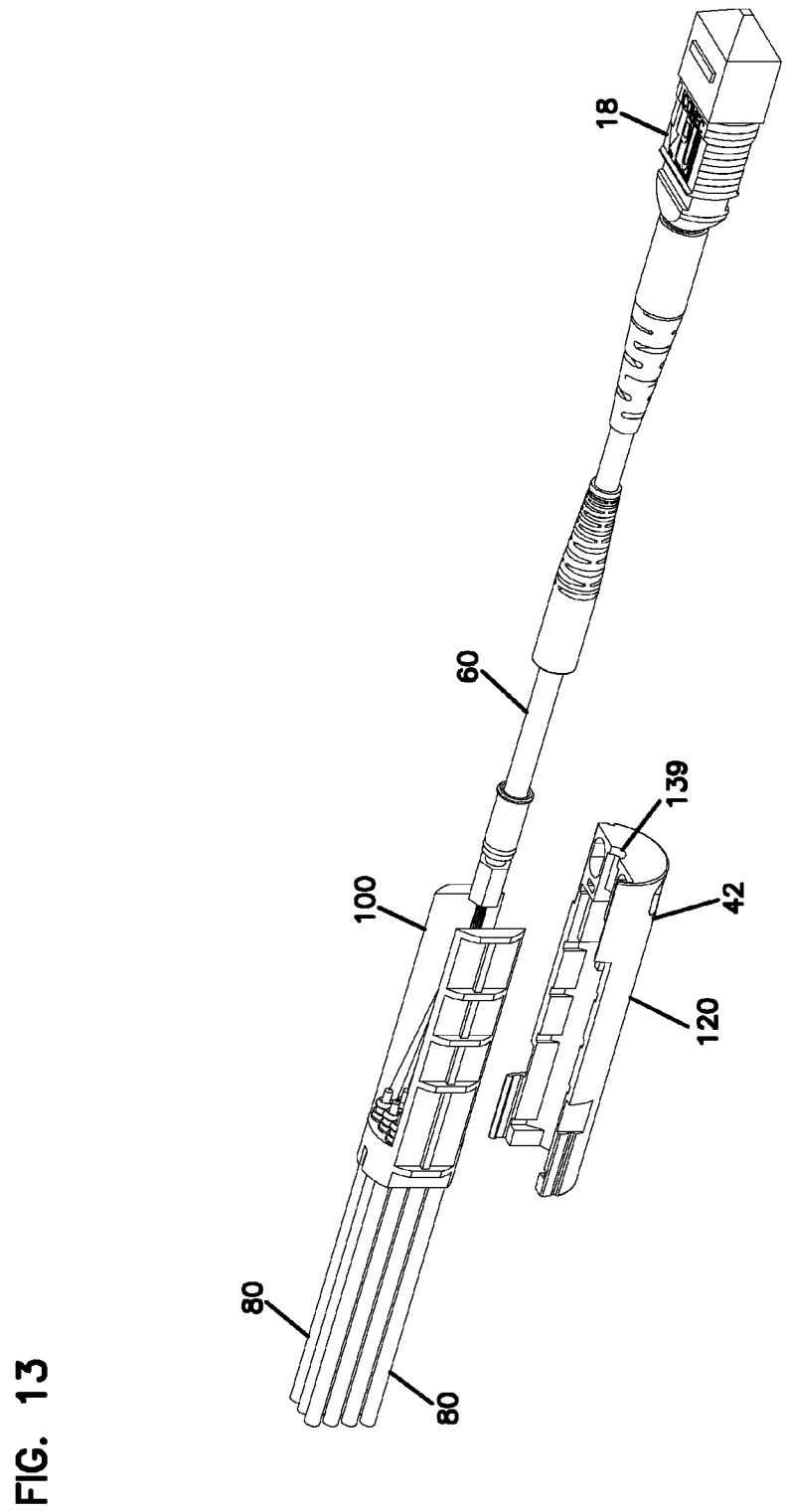
FIG. 13 shows the input cable assembly, and a plurality of the output furcation cable assemblies mounted to the inner housing prior to assembly with the lower housing portion of the fanout assembly body.
Figure 14:
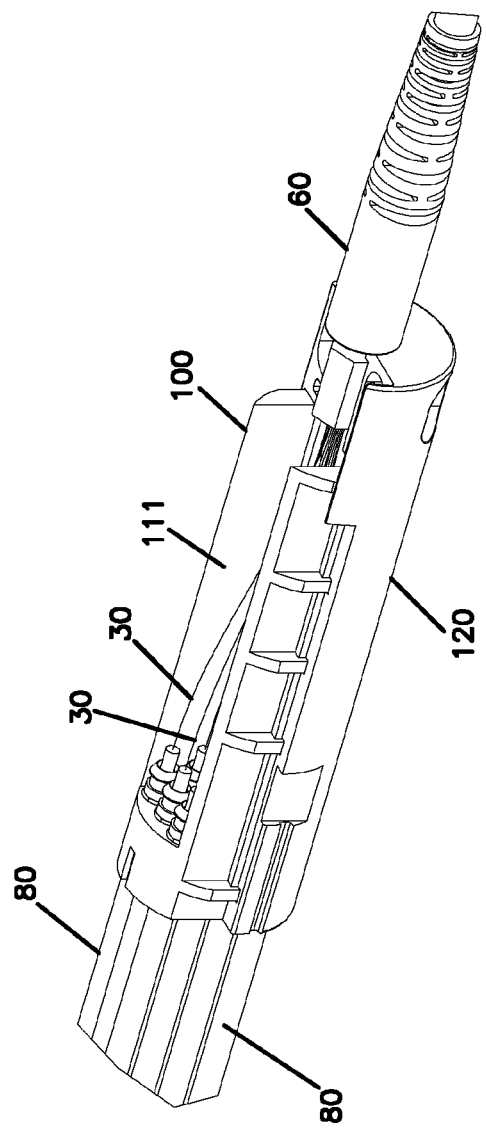
FIG. 14 shows the fanout assembly body and cable assemblies in perspective view prior to the epoxy pouring step.
Figure 15:
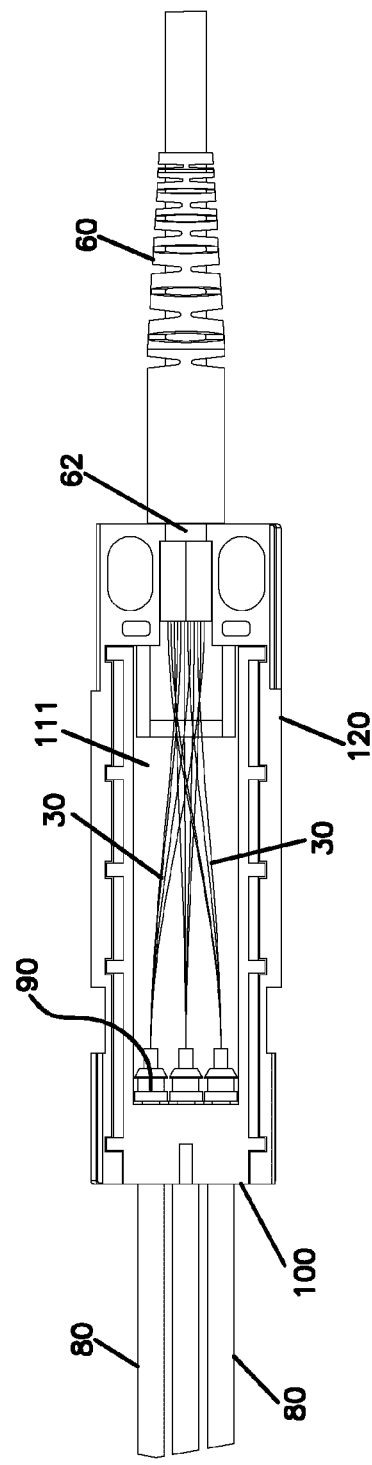
FIG. 15 is a top view of the view of FIG. 14.

Referring now to FIGS. 13 and 14, inner housing 100 with input cable assembly 60 and output furcation cable assemblies 80 is mounted to a lower housing portion 120 of body 42. As shown in FIGS. 1-3 and 5-8, an upper housing portion 130 mounts to lower housing portion 120 to enclose inner housing 100. Before upper housing portion 130 is mounted, epoxy is added to an interior of fanout 16 within a pocket 111.

Figure 16:
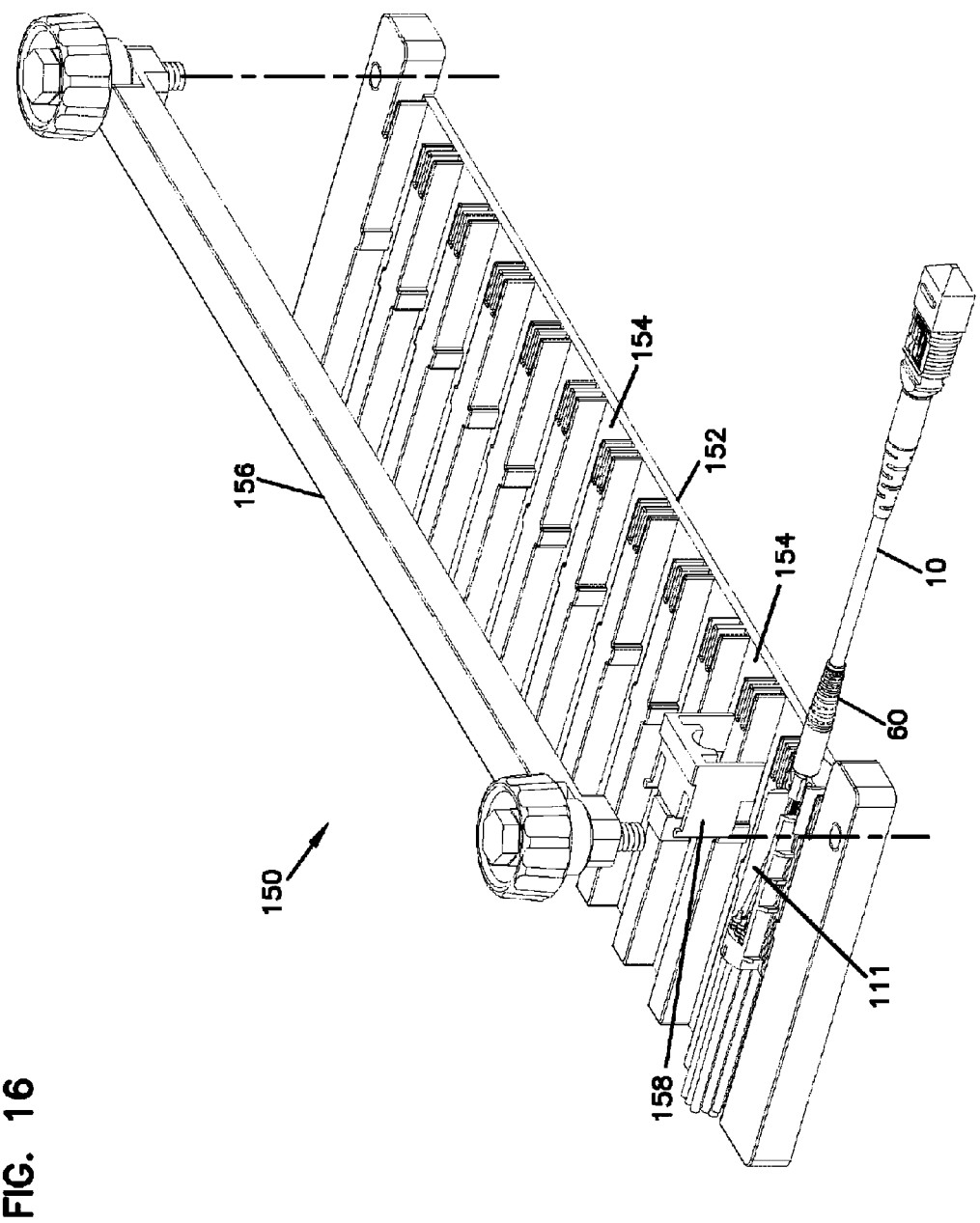
FIG. 16 shows the fanout assembly body and the cable assemblies being assembled into the holding fixture.
Figure 17:
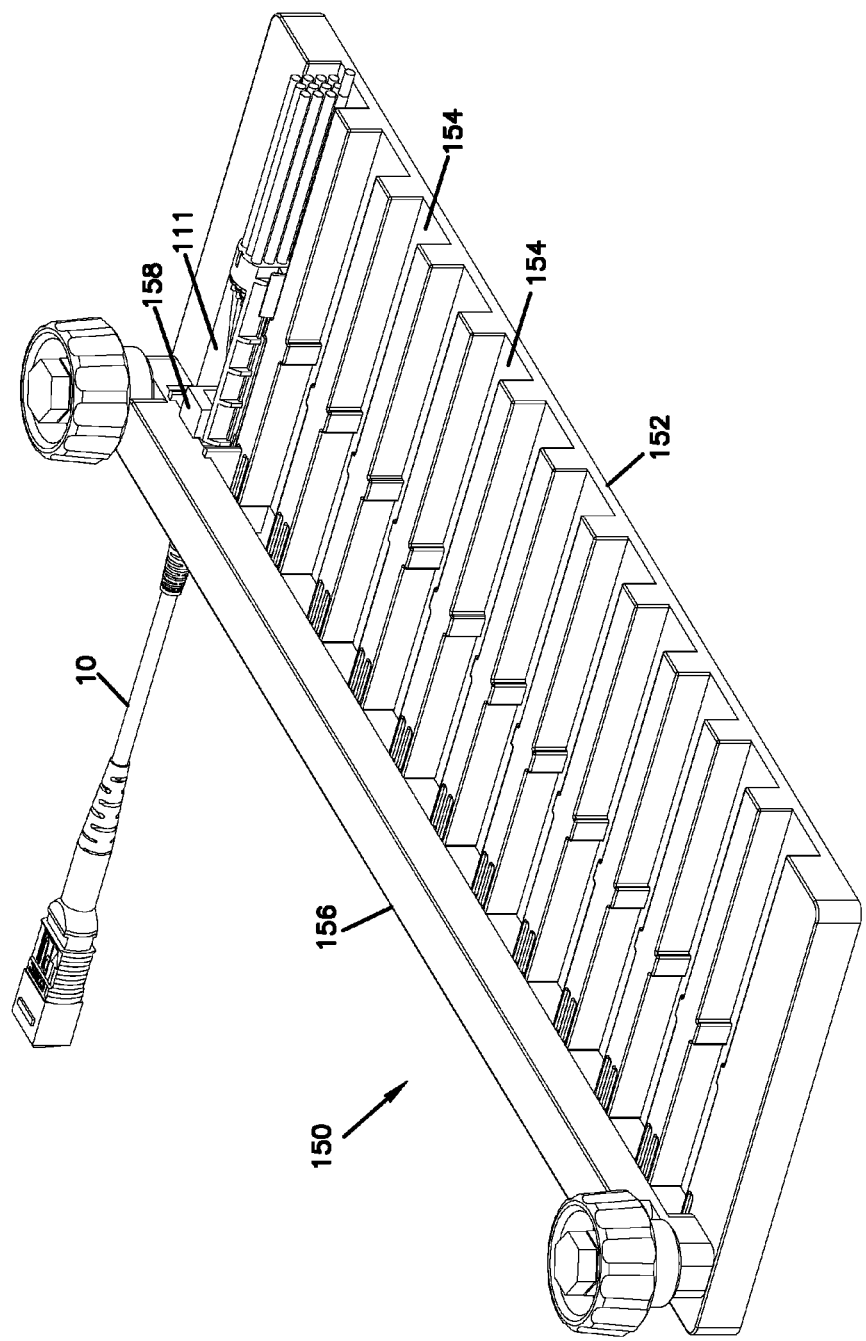
FIG. 17 shows the view of FIG. 16 with the fixture in the clamped position.
Figure 18:
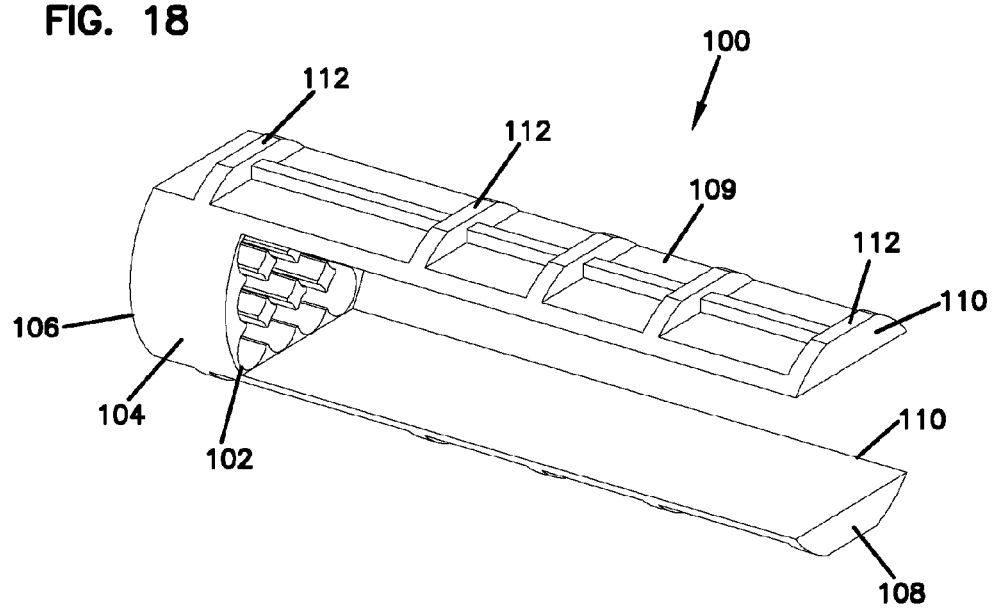
FIGS. 18 and 19 are perspective view of the inner housing of the fanout assembly body.
Figure 19:
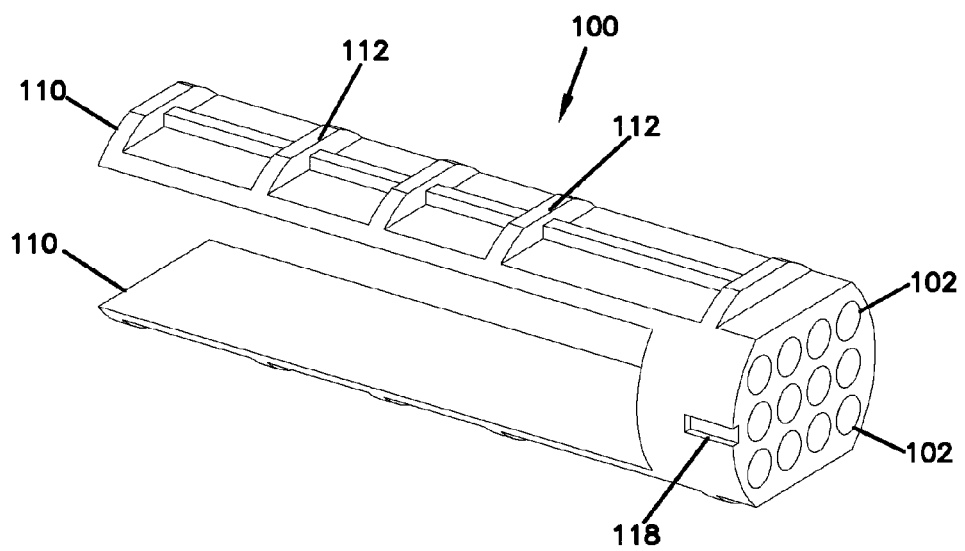
Figure 20:
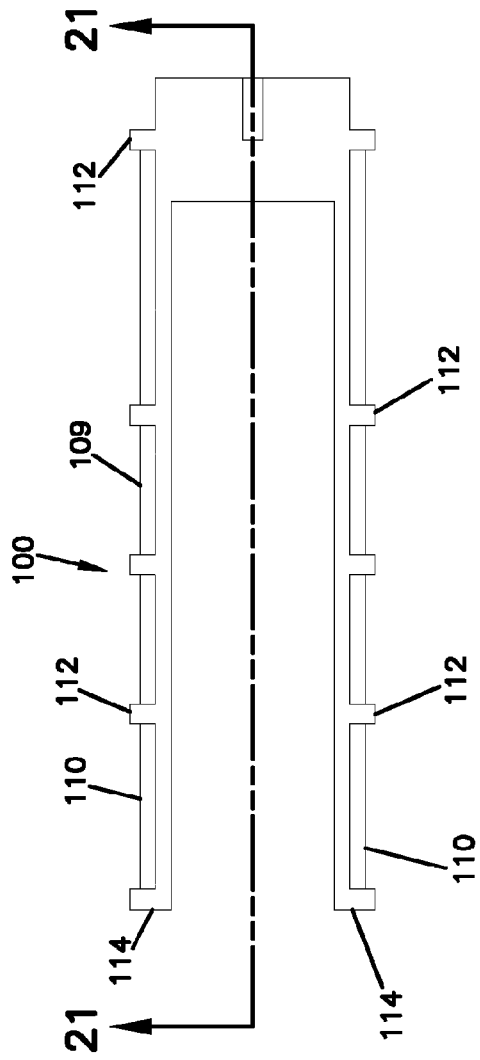
FIG. 20 is a top view of the inner housing of the fanout assembly body.
Figure 21:
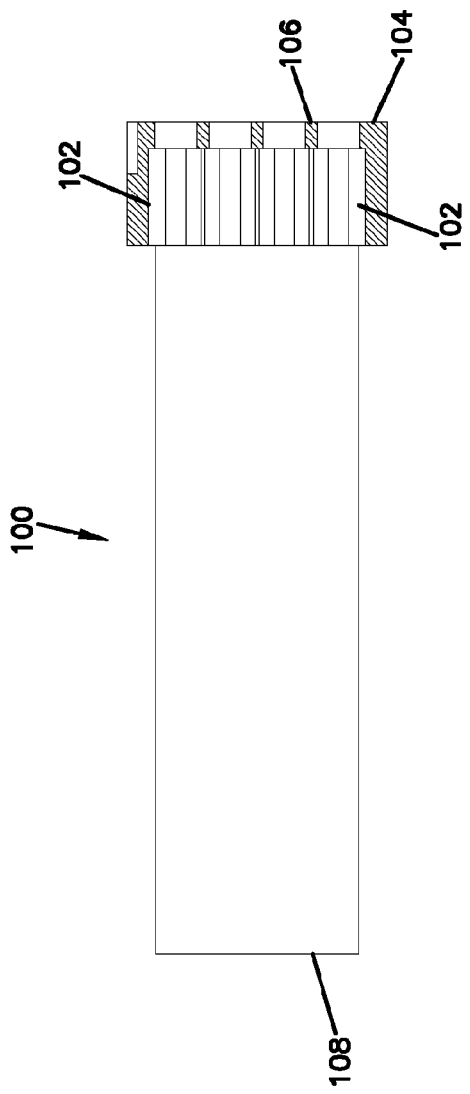
FIG. 21 is a cross-sectional view of the inner housing shown along lines 21-21 of FIG. 20.
Figure 22:
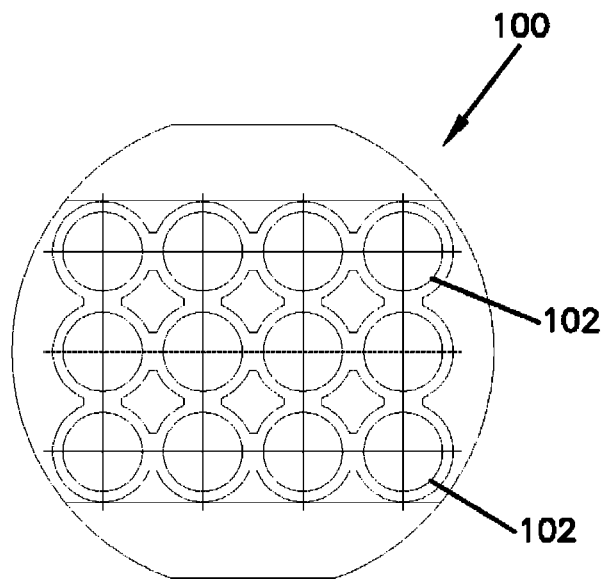
FIG. 22 is a first end view of the inner housing of the fanout assembly body.
Figure 23:
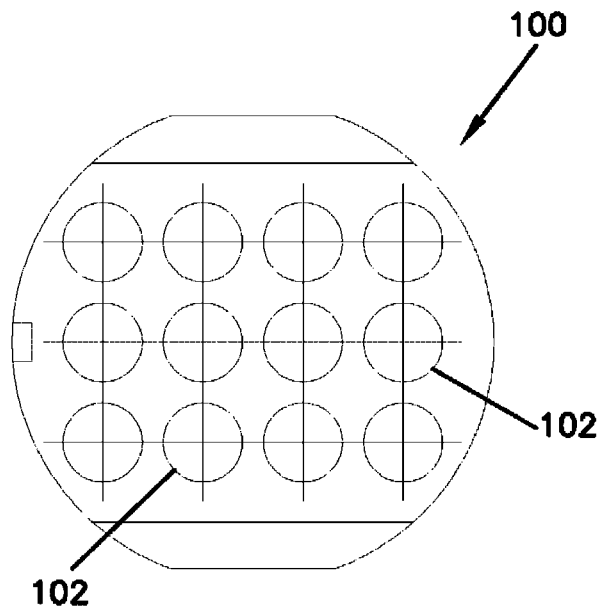
FIG. 23 is an opposite end view of the inner housing of the fanout assembly body.
Figure 24:
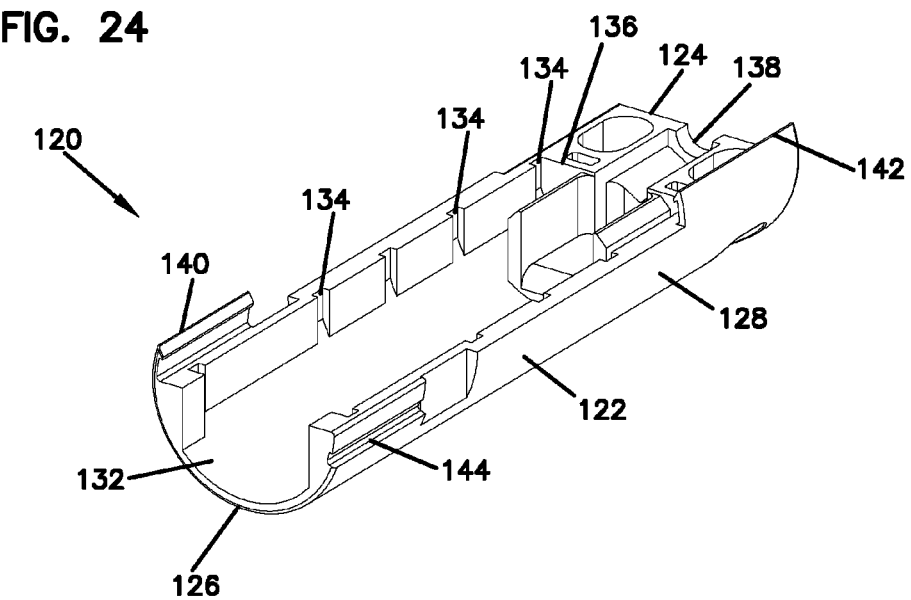
FIGS. 24 and 25 are perspective views of one of the outer housing portions of the fanout assembly body, the opposite outer housing portion having an identical construction.
Figure 25:
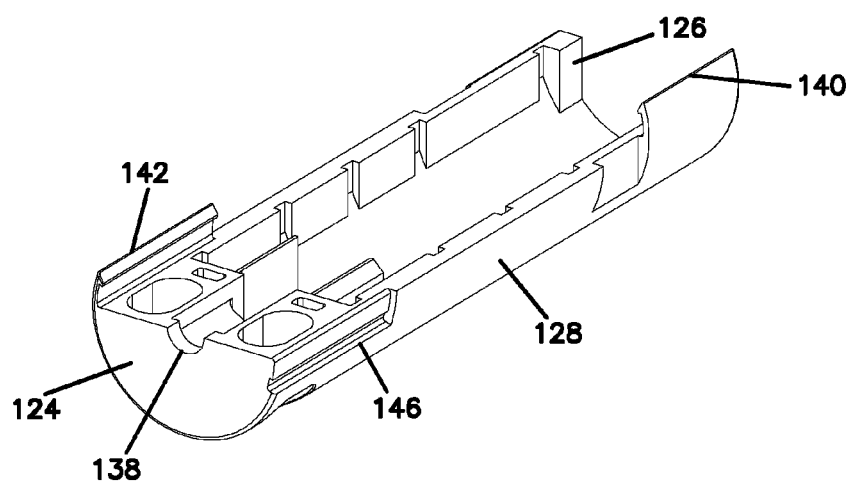
Figure 26:
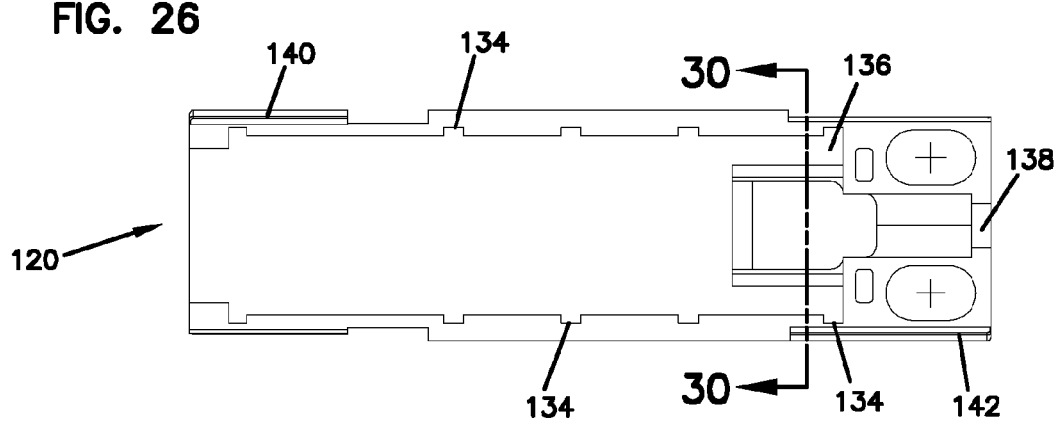
FIG. 26 is a top view of the outer housing portion.
Figure 27:
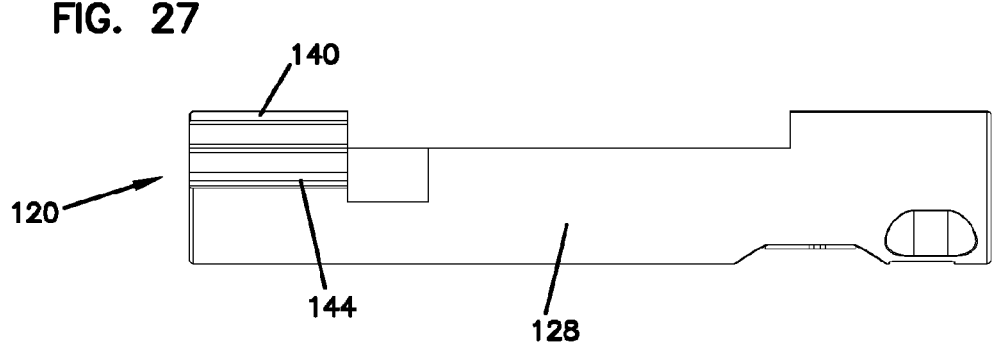
FIG. 27 is a side view of the outer housing portion.
Figure 28:
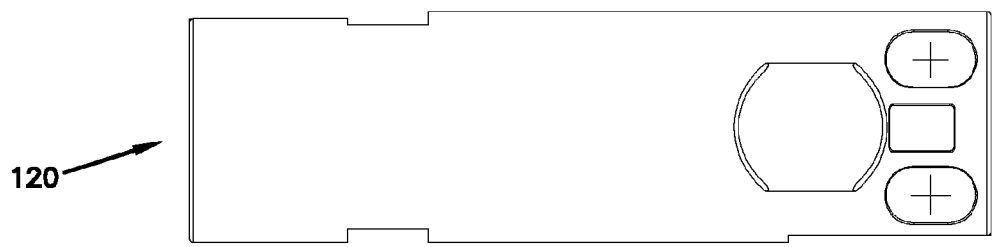
FIG. 28 is a bottom view of the outer housing portion.
Figure 30:
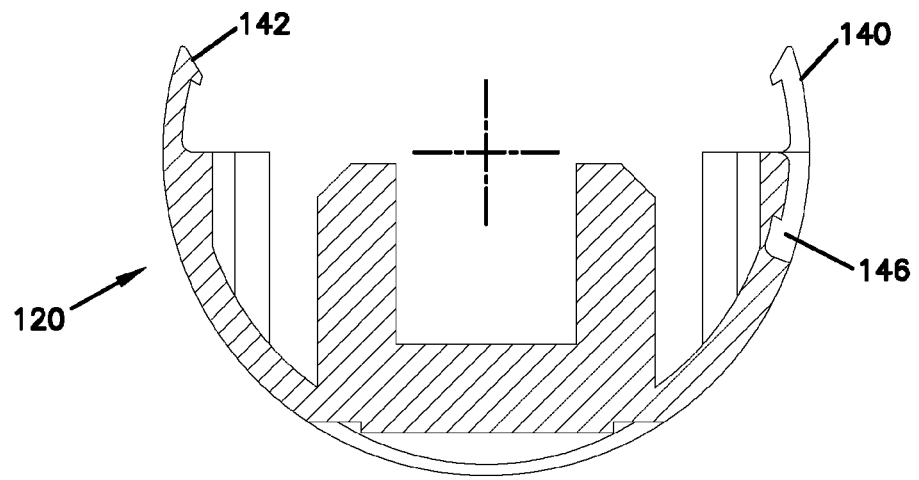
FIG. 30 is a cross-sectional view of the outer housing portion along lines 30-30 of FIG. 26.
Figure 29:
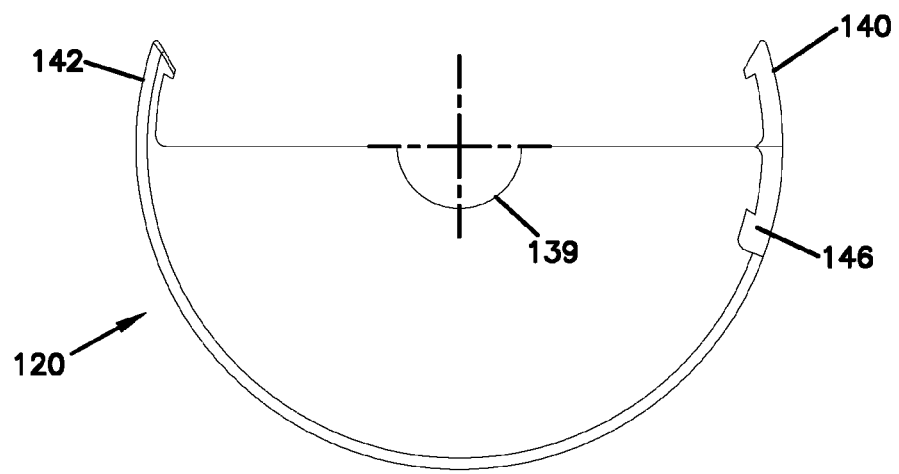
FIG. 29 is an end view of the outer housing portion.

A fixture 150 is shown in FIGS. 16 and 17 for holding the elements during the fiber fixing epoxy process. Each fixture 150 includes a base 152 defining a plurality of channels 154 for each receiving a fanout cable assembly 10. A clamping bar 156 holds clamp blocks 158 to hold each input cable assembly 60 in position during the epoxy process. As shown, notch 74 engages a shoulder 138 at inlet 139 to locate insert 62 with respect to body 42. Once secured, epoxy or other material can be poured into pocket 111 to surround fibers 30.

Following curing of the epoxy, upper housing portion 130 is mounted to lower housing portion 120 and inner housing 100 to form body 42. Cables 14 with interior fibers 30 are terminated with connectors 22 to complete fanout cable assembly 10.

Referring now to FIGS. 18-23, additional details of inner housing 100 are shown. Inner housing 100 includes a body 104 having a first end 106 and an opposite end 108 and extending in a longitudinal direction. Openings 102 for output cables 14 are located at end 106. Extending from end 106 are two side extensions 110. Side extensions 110 cooperate with lower housing portion 120 to form an epoxy receptacle or pocket 111. On an exterior 109 of side extensions 110 are a plurality of ribs 112 which cooperate with mating structure on outer housing portions 120, 130 to hold side extensions 110 in position. A locating notch or key 118 is provided on first end 106. Selected fibers 30 can be placed in selected openings 102 as desired. In this manner openings 102 can be filled with certain fibers for consistency between assemblies 10.

Referring now to FIGS. 24-30, additional details of lower housing portion 120 are shown. Upper housing portion 130 is identically configured to lower housing portion 120. Lower housing portion 120 includes a body 122 having a first end 124 and an opposite end 126 extending in a longitudinal direction. An exterior surface 128 defines a half-cylindrical shape. Disposed on interior 132 are a plurality of side slots 134 for the ribs 112 of inner housing 100, and end slots 136 for ends 114 of side extensions 110. Interior 132 also defines shoulder 138 for interfacing with notch 74 of insert 62 of input cable assembly 60. Lower housing portion 120 includes mating snaps 140, 142 and corresponding notches 144, 146 for snapping lower housing portion 120 to upper housing portion 130.

Body 42 includes a plurality of side notches 160, for receipt of engagement structure for stacking multiple bodies 42. Holes 162 are also provided for use in mounting to telecommunications equipment.

Fanout cable assembly 10 including cylindrically shaped body 42 has a compact design. One advantage of the cylindrically shaped body 42 is that body 42 can be inserted through a corresponding small opening in the telecommunications equipment during system set up, such as a round opening between areas in a wall box.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A cable fanout comprising:
   an inner housing including a first end including a plurality of openings, and the inner housing further including first and second extensions extending from the first end of the inner housing in a longitudinal direction;
   an outer housing including first and second housing portions, each of the housing portions extending from a first end of the housing portion to a second end of the housing portion along the longitudinal direction, wherein each of the housing portions includes a half cylindrical exterior surface which cooperate to form a fully cylindrical outer surface when mounted together;
   wherein the first and second extensions include a plurality of ribs arranged along an exterior surface of the first and second extensions;
   wherein the first and second housing portions define a plurality of side slots for receiving the plurality of ribs arranged along the exterior surface of the first and second extensions;
   wherein at least one of the first and second housing portions is mountable to the inner housing to form a pocket for receiving telecommunications cables and epoxy extending between the plurality of openings to an opposite end of the pocket defining an input opening;

a snap arrangement between the first and second housing portions to mount the first and second housing portions together with the inner housing therebetween; and wherein when the first and second housing portions are mounted together, a cylindrically shaped fanout body is formed.

2. The cable fanout of claim 1, further comprising:

a multi-fiber telecommunications input cable including a multi-fiber connector at a distal end of the multi-fiber telecommunications input cable, an outer jacket containing a plurality of individual fibers and a first strength member, and a first crimp member connected to the outer jacket and the first strength member at proximal ends, the first crimp member mounted to one end of the fanout body at the input opening, wherein the individual fibers extend from the outer jacket and the strength member through the fanout body;

a plurality of furcation jackets extending from an opposite end of the fanout body at the plurality of openings, each of the furcation jackets including an outer tube, and inner tube, and a second strength member between the inner and outer tubes, and second crimp members connected to the inner and outer tubes and the second strength member at proximal ends, the second crimp members mounted to the opposite end of the fanout body at the plurality of openings, wherein the furcation jackets pass through the plurality of openings in the inner housing;

epoxy positioned in the pocket around the individual fibers extending between the first crimp member and the second crimp members.

3. The cable fanout of claim 2, wherein the individual fibers are terminated with single fiber connectors at ends opposite to the distal end of the input cable.

4. The cable fanout of claim 3, further comprising a strain relief boot around the input cable and mounted adjacent to the input opening.

5. The cable fanout of claim 3, wherein the first and second housing portions are identical.

6. The cable fanout of claim 3, wherein the inner housing includes a key adjacent to the first end of the inner housing.

7. The cable fanout of claim 2, further comprising a strain relief boot around the input cable and mounted adjacent to the input opening.

8. The cable fanout of claim 1, wherein the first and second housing portions are identical.

9. The cable fanout of claim 1, wherein the inner housing includes a key adjacent to the first end of the inner housing.

10. The cable fanout of claim 1, wherein the first and second extensions include a plurality of ribs which cooperate with mating slots on each of the first and second housing portions.

11. A cable fanout comprising:

an inner housing including a first end including a plurality of openings, and first and second extensions extending from the first end in a longitudinal direction;

an outer housing including first and second housing portions, each of the housing portions extending from a first end of the housing portion to a second end of the housing portion along the longitudinal direction, wherein each of the housing portions includes a half cylindrical exterior surface which cooperate to form a fully cylindrical outer surface when mounted together;

wherein the first and second extensions include a plurality of ribs arranged along an exterior surface of the first and second extensions;

wherein the first and second housing portions define a plurality of side slots for receiving the plurality of ribs arranged along the exterior surface of the first and second extensions;

wherein at least one of the first and second housing portions is mountable to the inner housing to form a pocket for receiving telecommunications cables and a hardenable material extending between the plurality of openings to an opposite end of the pocket defining an input opening;

wherein the first and second housing portions are mounted together with the inner housing therebetween;

wherein when the first and second housing portions are mounted together, a cylindrically shaped fanout body is formed;

wherein the first and second housing portions are identical;

a multi-fiber telecommunications input cable including a multi-fiber connector at a distal end, an outer jacket containing a plurality of individual fibers and a first strength member, and a first crimp member connected to the outer jacket and the first strength member at proximal ends, the first crimp member mounted to one end of the fanout body at the input opening, wherein the individual fibers extend from the outer jacket and the strength member through the fanout body;

a plurality of furcation jackets extending from an opposite end of the fanout body at the plurality of openings, each of the furcation jackets including an outer tube, and inner tube, and a second strength member between the inner and outer tubes, and second crimp members connected to the inner and outer tubes and the second strength member at proximal ends, the second crimp members mounted to the opposite end of the fanout body at the plurality of openings, wherein the furcation jackets pass through the plurality of openings in the inner housing;

wherein the hardenable material is positioned in the pocket around the individual fibers extending between the first crimp member and the second crimp members.

12. The cable fanout of claim 11, wherein the individual fibers are terminated with single fiber connectors at ends opposite to the distal end of the input cable.

13. The cable fanout of claim 12, further comprising a strain relief boot around the input cable and mounted adjacent to the input opening.

14. The cable fanout of claim 12, wherein the inner housing includes a key adjacent to the first end of the inner housing.

15. The cable fanout of claim 11, further comprising a strain relief boot around the input cable and mounted adjacent to the input opening.

16. The cable fanout of claim 11, wherein the inner housing includes a key adjacent to the first end of the inner housing.

17. The cable fanout of claim 11, wherein the first and second extensions include a plurality of ribs which cooperate with mating slots on each of the first and second housing portions.

18. A cable fanout comprising:

an inner housing including a first end including a plurality of openings, and first and second extensions extending from the first end of the inner housing in a longitudinal direction;

wherein the first and second extensions include a plurality of ribs arranged along an exterior surface of the first and second extensions;

an outer housing including first and second housing portions, each of the housing portions extending from a first end of the housing portion to a second end of the housing portion along the longitudinal direction, wherein each of the housing portions includes an exterior surface which cooperate to form an outer surface when mounted together;

wherein the first and second housing portions define a plurality of side slots for receiving the plurality of ribs arranged along the exterior surface of the first and second extensions;

wherein at least one of the first and second housing portions is mountable to the inner housing to form a pocket for receiving telecommunications cables and epoxy extending between the plurality of openings to an opposite end of the pocket defining an input opening;

a snap arrangement between the first and second housing portions to mount the first and second housing portions together with the inner housing therebetween; and wherein when the first and second housing portions are mounted together, a fanout body is formed.

19. The cable fanout of claim 18, wherein the first and second housing portions are identical.

20. A cable fanout comprising:

an inner housing including a first end including a plurality of openings, and the inner housing further including first and second extensions extending from the first end of the inner housing in a longitudinal direction;

an outer housing including first and second housing portions, each of the housing portions extending from a first end of the housing portion to a second end of the housing portion along the longitudinal direction, wherein each of the housing portions includes a half cylindrical exterior surface which cooperate to form a fully cylindrical outer surface when mounted together;

wherein the first and second extensions include a plurality of ribs arranged along an exterior surface of the first and second extensions;

wherein the first and second housing portions define a plurality of side slots for receiving the plurality of ribs arranged along the exterior surface of the first and second extensions;

wherein at least one of the first and second housing portions is mountable to the inner housing, and upon mounting at least one of the first and second extensions extend above at least one of the first and second housing portions in a direction perpendicular to the longitudinal direction to form a pocket for receiving telecommunications cables and epoxy extending between the plurality of openings to an opposite end of the pocket defining an input opening;

a snap arrangement between the first and second housing portions to mount the first and second housing portions together with the inner housing therebetween; and wherein when the first and second housing portions are mounted together, a cylindrically shaped fanout body is formed.

* * * * *